Aug. 20, 1957     R. A. ANDREWS     2,803,790

POWER TRANSMISSION

Filed Jan. 4, 1954

INVENTOR.
RUFUS A. ANDREWS
BY *Clement J. Paynoska*
ATTORNEY

2,803,790
POWER TRANSMISSION

Rufus A. Andrews, Glendale, Mo., assignor to Vickers, Incorporated, Detroit, Mich., a corporation of Michigan Application January 4, 1954, Serial No. 402,122

13 Claims. (Cl. 317—191)

This invention relates to power transmission and more particularly to electromagnetic translating devices. The type of electromagnetic translating device contemplated herein has relatively movable ferromagnetic stator and armature members excited by an electric coil, which produces a magnetic field that causes magnetic attraction between the armature and stator, drawing the armature to the stator.

One example of such a translating device is what is commonly known as a solenoid. Solenoids have plunger type armatures that may be used to operate many devices requiring mechanical actuation, for example certain types of hydraulic valves. In the latter case a valve rod may be in contact with the plunger of the solenoid and actuated by the movement of the plunger.

In most electromagnetic translating devices the magnetic structure of the armature and sometimes the stator are required to take operational shocks, such as through impacts which tend to deform the member receiving the shock. This is especially true in alternating current solenoids where the magnetic structure is made of laminated magnetic material.

It has been known to provide hard inserts in the impact end of solenoid plungers; however, shortened life due to loosening and turning of the inserts in their sockets after a relatively small number of impacts has been a major problem.

In accordance with the present invention a magnetic member of an electromagnetic translating device is provided with a hard shock receiving member fixed in a cavity provided in the magnetic member and open to a surface thereof, the cavity walls and the shock member having interlocking contours for preventing the insert from turning in the cavity and from falling out of the cavity. Another aspect of the invention is the use of a fastening element, such as a rivet, to support the shock member in absorbing and further distributing the shock.

It is therefore an object of the present invention to provide an electromagnetic translating device with a hard, shock-receiving member which is restrained from turning in its cavity home and from falling out of the cavity by interlocking contours of the shock member and the cavity walls.

Another object of the invention is to provide an electromagnetic translating device with a hard, shock-receiving member backed up by a fastening element, such as a rivet, to further absorb and distribute the shock over a wider area.

Further objects and advantages of the present invention will be apparent from the following description, reference being had to the accompanying drawings wherein a preferred form of the present invention is clearly shown.

Figure 1:
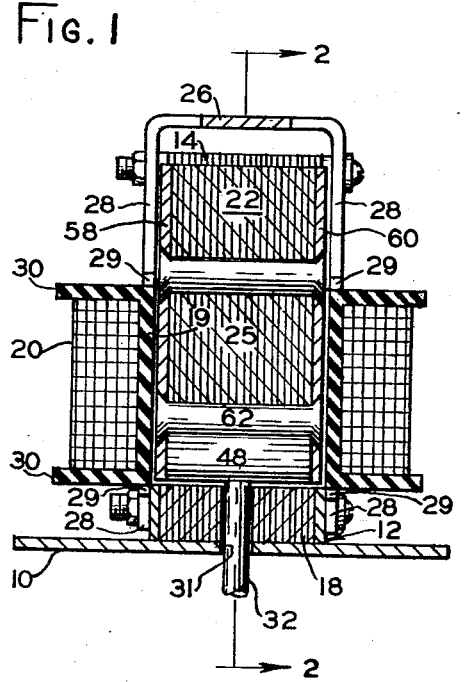
Fig. 1 is a vertical section in a plane parallel to the front elevation of a solenoid embodying the present invention, the view being in a plane which cuts the solenoid into two symmetrical halves, except for some rivets and a shock member which are shown in full.

As shown in the drawings a solenoid is provided with a base 10 on which is mounted a generally C-shaped magnetic stator 12 having parallel arms 14 and 16 at opposite ends of an intermediate member 18. A bobbin 19 carrying an electric coil 20, which may be energized from any suitable electric current source (not shown), is positioned between the parallel arms 14 and 16. A T-shaped, plunger type armature 22 with arms 23 and 24 has a shank 25 which reciprocates in the aperture of the coil bobbin 19. The stator 12 and the armature 22 may be made of any suitable magnetic material, for example, silicon steel laminations bound together by any suitable means, such as welds, rivets, etc. In the example shown the laminations are secured together with rivets.

When the coil 20 is energized magnetic attraction forces the plunger downward to its lowermost position, which is the position shown in the drawings. The upward movement of the armature 22 may be limited by a suitable bumper 26 having four legs 28 (only two legs shown in each of Figs. 1 and 2) secured to the stator arms 14 and 16. The legs 28 are provided with integral tabs 29 which fit in slots formed in the flanges 30 of the coil bobbin 19, thus holding the coil against lateral movement. Although it is customary to provide metal guides between the plunger and the walls defining the coil bobbin aperture, they are not shown to avoid complicating the drawing.

An aperture 31 is provided through the base 10 and the intermediate member 18 for receiving the end of a reciprocable rod 32 for actuation thereof by the armature 22. The rod 32 may be connected to any device requiring mechanical actuation, for example a valve.

Figure 2:
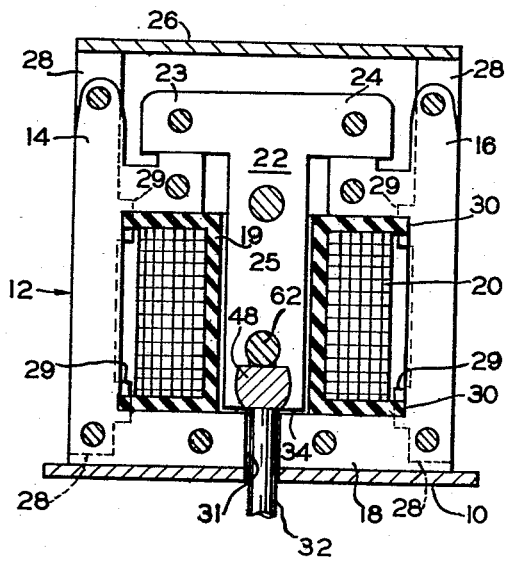
Fig. 2 is a vertical section of the same solenoid taken at right angles to the plane of the section Fig. 1 on the line 2—2 of that figure, the plane of this view cutting the solenoid into two symmetrical halves.
Figure 3:
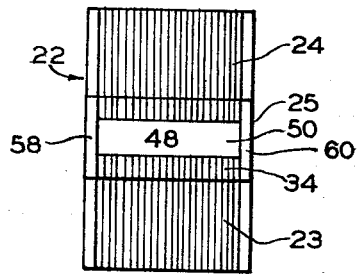
Fig. 3 is a full bottom view of the plunger only in the solenoid of Fig. 1.
Figure 4:
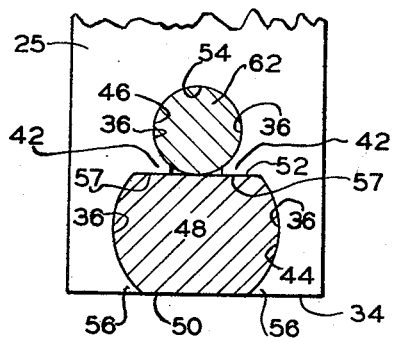
Fig. 4 is an expanded view of a part of Fig. 2.

Contiguous edges of armature laminae form a surface 34 on the lower end of the plunger shank 25. This surface is shown in full in Fig. 3. In the plunger shank 25 and below the surface 34 are walls 36 (Fig. 4) defining a cavity in the form of a double-barreled groove running crosswise of the laminae and having its mouth open to the surface 34. Inwardly extending portions 42 of the cavity walls 36 have the effect of dividing the groove into two parallel intersecting apertures or chambers, the outer chamber at the top or mouth of the groove being indicated at 44 and the inner chamber being indicated at 46. Figs. 2 and 4 illustrate the cross-section of the groove which is uniform through the length of the groove. Disposed in the outer chamber 44 is a shock receiving member 48 in the form of a hard insert having a contact face 50 adapted to contact the end of the rod 32. The back side 52 of the insert faces toward the bottom 54 of the groove. Flat ends of the insert are adjacent to the plunger side plates 58 and 60 which prevent the insert from sliding along its length crosswise of the laminae.

As is apparent in Figs. 2 and 4, the cavity walls 36 and the insert 48 are provided with conforming interlocking contours which key the insert in the cavity and prevent the insert from falling out of the cavity and from rotating in the cavity around an axis parallel to the surface 34 and perpendicular to the planes of the plunger laminae.

The contour of the cavity walls is such as to provide wall portions that overlap portions of the insert to prevent the insert from falling out of the cavity.

Inwardly extending portions 56 of the cavity walls 36 at the mouth of the groove are of such contour that they embrace or overlap a portion of the insert. Thus, the insert cannot fall out of the groove.

Although the cross-section of the insert seen in the drawings is part of a circle, and the side walls of the chamber 44 are parts of a circle, the shock member is restrained from rotating within the chamber by the flat surface of the back side 52 of the shock member mating with flat surfaces 57 on the inwardly extending portions 42 of the cavity walls behind the insert 48. Since these flat surfaces are perpendicular to the line of impact, they provide a desirable distribution of the shock forces.

The term "interlocking contours" may be explained by a negative illustration. A round insert in a round hole can be turned in the hole because such a combination does not possess interlocking or keying contours that restrain relative rotation. In fact, an insert with any shape will turn in a round hole; however, if a round insert and hole are modified with corresponding straight sections as illustrated by the flat surfaces 52 and 57 shown in Figs. 2 and 4, the insert and the hole will have interlocking contours which key the insert against rotation. An insert with an oval cross-section in an oval hole will not rotate therein because such a combination inherently has interlocking contours whereby the insert is keyed in the hole to prevent such relative movement. Other examples of interlocking contours preventing rotation of the insert in the cavity are inserts and corresponding cavity walls having the following shapes: diamond, rectangular, polygonal, etc. While these and the oval are regular geometrical shapes, an irregular configuration may also be used as long as the insert is "keyed" in the cavity so that it will be restrained from rotating by interlocking contours of the insert and cavity walls.

The insert may be further secured in the cavity by welding, silver brazing, or by other suitable means. Enough clearance may be allowed between surfaces of the insert and the cavity walls to allow silver alloy or other suitable bonding material to flow therebetween and secure a bond. In the case of silver brazing good results have been obtained with clearances running from .002 to .005 inch.

As seen in the drawings, the plunger laminations are sandwiched between side plates 58 and 60 and bound together with rivets. One of the rivets is in direct contact with the insert 48 along its entire length, and serves to further absorb and distribute over a larger area operational shock, such as impact, received by the insert. This rivet indicated at 62 passes, crosswise of the plunger laminae, through the inner chamber of the groove between the shock member 48 and the bottom of the groove, and extends through the plunger side plates 58 and 60 where it is upset.

Preferably the hard shock member 48 should be less deformable by impact and other shock than the part of the plunger which it protects from direct impact and other shock. Any suitable substantially non-deformable material may be used for the shock member 48, for example, it may be made of hardened tool steel, Stellite or any other suitable material that will withstand repeated operational impacts or other shock without serious deformation. One example of hardened tool steel which was used with marked success was an 18–4–2 type with the following percentage analysis: Carbon .8; chromium 4.0; tungsten 18.5; vanadium 2.0; molybdenum .75 and the balance iron. The shock member may be preformed or it may be formed in situ by flowing suitable material in melted or plastic form into the cavity and allowing the material to set. In this manner the flowing material assumes the contours of the cavity walls. Any suitable weld filler metal that solidifies into a hard, substantially non-deformable form may be used, for example, 3%–10% chromium tool steel welding rod may be laid in with a shielded arc.

The cavity may be formed in the surface 34 by cutting the proper shape in the individual laminations before they are assembled together, and may extend across all or part of the laminae. In the illustration the groove extends to and ends at the side plates 58 and 60 of the plunger 22, which side plates restrain the shock member from movement endwise of the groove. The latter construction permits all the laminae to be cut alike. The groove and shock member could extend through the side plates, and endwise restraint of the shock member could be provided by a weld at the ends thereof.

While the form of embodiment of the invention as herein disclosed constitutes a preferred form, it is to be understood that other forms might be adopted, all coming within the scope of the claims which follow.

What is claimed is as follows:

1. An electromagnetic translating device comprising relatively movable stator and armature members, at least one of said members comprising a laminated ferromagnetic structure adapted to receive an operational mechanical shock, said structure having a surface formed by laminae edges and walls below said surface defining a groove in and having its mouth open to said surface, and a substantially non-deformable shock member for receiving said shock fixed in said groove, said walls having portions projecting toward each other to prevent the shock member from falling out of the groove, said walls and said shock member having interlocking contours for preventing the shock member from rotating around any axis.

2. An electromagnetic translating device comprising relatively movable stator and armature members, one of said members being adapted to receive an operational mechanical shock and comprising a plurality of laminations bound together, a surface formed by laminae edges, walls below said surface defining the bottom and sides of a cavity having its mouth in said surface, a shock member for receiving said shock fixed in said cavity, the back side of the shock member facing toward the bottom of said cavity, and a fastening element for binding said laminations together, said element extending through said laminations and directly contacting the back side of said shock member, whereby shock is transmitted to the fastening element and distributed thereby.

3. An electromagnetic translating device comprising relatively movable stator and armature members, one of said members being adapted to receive an operational mechanical shock and comprising a plurality of laminations bound together, each lamination having a slot at one edge, a surface formed by laminae edges, the laminations being stacked with the slots in matching relation to form walls below said surface defining a cavity formed in and having its mouth open to said surface, a shock member for receiving said shock fixed in said cavity, and a fastening element for binding said laminations together, said element passing through said cavity between the shock member and the bottom of the cavity and directly contacting said shock member the shock member and the defining edges of the slots being shaped to allow insertion of the shock member through the slots in a direction perpendicular to the laminae planes during manufacture, said walls having inwardly projecting portions partially overlapping the shock member to prevent it from falling out of the cavity.

4. An electromagnetic translating device comprising relatively movable stator and armature members, one of said members being adapted to receive an operational mechanical shock and comprising a plurality of laminations bound together, a surface formed by laminae edges, walls below said surface defining a cavity formed in and having its mouth open to said surface, a shock member for receiving said shock fixed in said cavity, and a fastening element for binding said laminations together, said element passing through said cavity between the shock member and the bottom of the cavity and directly contacting said shock member, said walls and said shock member having interlocking corresponding contours for preventing the shock member from falling out of the cavity and from rotating about any axis.

5. A plunger for use in an electromagnetic solenoid, said plunger comprising a ferromagnetic laminated structure, a surface formed by laminae edges at one end of the plunger, walls below said surface defining a groove formed in and open to said surface, and a substantially non-deformable shock receiving member fixed in said groove, said walls having inwardly projecting portions to prevent the member from falling out of the groove, said walls and said shock member having corresponding interlocking contours for locking the shock member against all rotation.

6. A plunger for use in an electromagnetic solenoid, said plunger comprising a plurality of laminations bound together, a surface formed by laminae edges at one end of the plunger, walls below said surface defining a groove in and having its mouth open to said surface, a hard shock receiving member in said groove, the back of the shock member facing toward the bottom of the groove, and a solid fastening element for binding said laminations together, said element passing through said groove between the back of the shock member and the bottom of the groove and extending to opposite sides of the plunger, said shock member being adapted to transmit shock to said fastening element by direct contact.

7. A plunger for use in an electromagnetic solenoid, said plunger comprising a plurality of laminations bound together, a surface formed by laminae edges at one end of the plunger, walls below said surface defining a groove in and having its mouth open to said surface, a hard shock receiving member in said groove, the back of the shock member facing toward the bottom of the groove, and a solid fastening element for binding said laminations together, said element passing through said groove between the back of the shock member and the bottom of the groove and extending to opposite sides of the plunger, said shock member being adapted to transmit shock to said fastening element by direct contact, said shock member and said walls having interlocking contours for restraining the shock member from falling out of the groove mouth and from rotating around any axis.

8. A plunger for use in an electromagnetic solenoid, said plunger comprising a plurality of laminations bound together, a surface formed by laminae edges at one end of the plunger, walls below said surface defining a groove in and having its mouth open to said surface, a hard shock receiving member in said groove, the back of the shock member facing toward the bottom of the groove, and a solid fastening element for binding said laminations together, said element passing through said groove between the back of the shock member and the bottom of the groove and extending to opposite sides of the plunger, said shock member being adapted to transmit shock to said fastening element by direct contact, said shock member and said walls having flat mating surfaces to prevent rotation of the shock member around an axis lying crosswise of the laminae, said walls having inwardly extending portions at the mouth of the groove partially overlapping the shock member to restrain the shock member from falling out of the groove.

9. A plunger for use in an electromagnetic solenoid, said plunger comprising a plurality of laminations bound together, a surface formed by laminae edges at one end of the plunger, walls below said surface defining a groove in and having its mouth open to said surface, a hard shock receiving member in said groove, the back of the shock member facing toward the bottom of the groove, and a solid fastening element in said groove between the back of the shock member and the bottom of the groove and extending to opposite sides of the plunger, the back of said shock member being in contact with said fastening element to transmit shock to said fastening element, said walls having inwardly extending portions at the mouth of the groove partially overlapping the shock member to restrain the shock member from falling out of the groove.

10. A plunger for use in an electromagnetic solenoid, said plunger comprising ferromagnetic laminations whose edges form a surface at one end of the plunger, said plunger being fabricated to provide a groove in and open to said surface and crosswise of the laminae, said groove having side walls which project toward each other at the top of the groove, and a substantially non-deformable shock member fixed in said groove and partially overlapped by said wall portions which project toward each other, said walls and said shock member having corresponding noncircular interlocking contours which, by their shape, lock the shock member against all rotation.

11. A plunger for use in an electromagnetic solenoid, said plunger comprising a plurality of laminations bound together between side plates, a surface formed by laminae edges at one end of the plunger, walls below said surface defining the sides of a groove in and having its mouth open to said surface, a shock receiving member in said groove, said groove extending to said plates and said shock member extending the length of the groove, the back of the shock member facing toward the bottom of the groove, said shock member being less deformable than said laminations, and a solid fastening element in said groove between the back of the shock member and the bottom of the groove and extending to opposite sides of the plunger, the back of said shock member being in contact with said fastening element to transmit shock to said fastening element, said walls having inwardly extending portions at the mouth of the groove partially overlapping the shock member to restrain the shock member from falling out of the groove.

12. An electromagnetic translating device comprising relatively movable stator and armature members, one of said members being adapted to receive an operational mechanical shock and comprising a plurality of laminations bound together, each lamination having a slot at one edge, a surface formed by laminae edges, the laminations being stacked with the slots in matching relation to form walls below said surface defining a cavity formed in and having its mouth open to said surface, and a shock member for receiving said shock fixed in said cavity, the shock member and the defining edges of the slots being shaped to allow insertion of the shock member through the slots in a direction perpendicular to the lamina planes during manufacture, said walls and said shock member having interlocking corresponding contours for restraining the shock member from falling out of the cavity and from rotating about any axis.

13. An electromagnetic translating device comprising relatively movable stator and armature members, one of said members comprising ferromagnetic laminations whose edges form a surface at one end of said one member, said one member having side plates and being fabricated to provide a groove in and open to said surface and extending crosswise of the laminae to said side plates, said groove having side wall means with inward projections at the top of the groove, and a substantially non-deformable shock member fixed in said groove and partially overlapped by said inward projections, said shock member extending substantially to said plates, said walls and said shock member having corresponding interlocking contours for locking the shock member against all rotation.

References Cited in the file of this patent

UNITED STATES PATENTS

| | | |
|---|---|---|
| 818,589 | Wegner | Apr. 24, 1906 |
| 1,723,607 | Dominguez | Aug. 6, 1929 |
| 2,671,187 | Jencks | Mar. 2, 1954 |

FOREIGN PATENTS

| | | |
|---|---|---|
| 548,717 | Great Britain | Oct. 21, 1942 |